(12) United States Patent
Liu et al.

(10) Patent No.: US 8,984,520 B2
(45) Date of Patent: Mar. 17, 2015

(54) RESOURCE MODELING AND SCHEDULING FOR EXTENSIBLE COMPUTING PLATFORMS

(75) Inventors: Jie Liu, Sammamish, WA (US); Feng Zhao, Issaquah, WA (US); Michel Goraczko, Seattle, WA (US); Slobodan Matic, Berkeley, CA (US); Dimitrios Lymberopoulos, Redmond, WA (US); Nissanka Priyantha, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1775 days.

(21) Appl. No.: 11/763,397

(22) Filed: Jun. 14, 2007

(65) Prior Publication Data

US 2008/0313640 A1     Dec. 18, 2008

(51) Int. Cl.
  *G06F 9/46* (2006.01)
  *G06F 1/00* (2006.01)
  *G06F 1/32* (2006.01)
  *G06F 9/48* (2006.01)

(52) U.S. Cl.
  CPC .............. *G06F 1/3203* (2013.01); *G06F 1/329* (2013.01); *G06F 9/4893* (2013.01); *Y02B 60/144* (2013.01); *G06F 2209/484* (2013.01)
  USPC ............ 718/104; 718/102; 713/323; 713/300

(58) Field of Classification Search
  USPC ....................................................... 718/100
  See application file for complete search history.

(56) References Cited

U.S. PATENT DOCUMENTS

| 5,216,593 | A  |   | 6/1993  | Dietrich et al. |
| 6,086,628 | A  | * | 7/2000  | Dave et al. ................... 716/105 |
| 6,112,023 | A  |   | 8/2000  | Dave et al. |
| 6,550,042 | B1 |   | 4/2003  | Dave |
| 6,901,521 | B2 | * | 5/2005  | Chauvel et al. ............... 713/300 |
| 7,111,177 | B1 | * | 9/2006  | Chauvel et al. ............... 713/300 |
| 7,694,158 | B2 | * | 4/2010  | Melpignano et al. ......... 713/300 |
| 8,181,051 | B2 | * | 5/2012  | Barth ............................. 713/323 |
| 2002/0156669 | A1 |   | 10/2002 | Verhaegh et al. |
| 2006/0064696 | A1 |   | 3/2006  | Lin et al. |

(Continued)

OTHER PUBLICATIONS

Sapurtra et al. "Energy-Conscious Compilation Based on Voltage Scaling", LCTES'02-SCOPES'02, Jun. 19-21, 2002, Berlin, Germany, pp. 2-11.*

(Continued)

*Primary Examiner* — Abdullah Al Kawsar
*Assistant Examiner* — Bing Zhao
(74) *Attorney, Agent, or Firm* — Kusnyer Ladislav; Judy Yee; Micky Minhas

(57) ABSTRACT

Energy management modeling and scheduling techniques are described for reducing the power consumed to execute an application on a multi-processor computing platform within a certain time period. In one embodiment, a sophisticated resource model which accounts for discrete operating modes for computing components/resources on a computing platform and transition costs for transitioning between each of the discrete modes is described. This resource model provides information for a specific heterogeneous multi-processor computing platform and an application being implemented on the platform in a form that can be processed by a selection module, typically utilizing an integer linear programming (ILP) solver or algorithm, to select a task schedule and operating configuration(s) for executing the application within a given time.

19 Claims, 5 Drawing Sheets

(56) References Cited

U.S. PATENT DOCUMENTS

2006/0089864 A1    4/2006    Feng et al.
2006/0253853 A1    11/2006    Jiang
2008/0301474 A1*   12/2008    Bussa et al. .................. 713/300

OTHER PUBLICATIONS

Burd et al. "A Dynamic Voltage Scaled Microprocessor System", IEEE Journal of Solid-State Circuits, vol. 35, No. 11, Nov. 2000.*

Chabini, et al., "Unification of Scheduling Binding and Retiming to Reduce Power Consumption Under Timings and Resources Constraints", available at least as early as Jan. 23, 2007, at <<http://ieeexplore.ieee.org/iel5/92/33143/01561241.pdf?isNumber=>>, IEEE, 2005, vol. 13, No. 10, pp. 1113-1126.

Wolinski, "A Constraints Programming Approach to Communication Scheduling on SoPC Architectures", available at least as early as Jan. 23, 2007, at <<http://ieeexplore.ieee.org/iel5/9267/29440/01333291.pdf?isNumber=>>, IEEE, pp. 1-8.

Wu, "Energy-Efficient, Utility Accrual Scheduling under Resource Constraints for Mobile Embedded Systems", available at least as early as Jan. 23, 2007, at <<http://delivery.acm.org/10.1145/1170000/1165781/p513-wu.pdf?key1=1165781&key2=0122359611&coll=GUIDE&dl=GUIDE&CFID=9658061&CFTOKEN=22984485>>, ACM, 2006, vol. 5, No. 3, pp. 513-542.

* cited by examiner

RESOURCE MODELING AND SCHEDULING FOR EXTENSIBLE COMPUTING PLATFORMS

BACKGROUND

Often, it is desirable to configure a computing platform on a computing device to execute an application in the shortest possible time while using the least amount of power possible. Unfortunately however, there is typically a trade off between the amount of time and the amount of power that a computing platform requires to execute an application. As such, one option is to focus on minimizing the amount of power consumed to execute an application within a certain tolerable amount of time. In this regard, one approach involves providing a resource model that identifies available computing platform processing options for executing an application along with the power consumption requirements and processing speeds associated with each option. In theory, such a model might be used to identify and select a preferable processing option associated with executing the application using the least amount of power within a given time constraint. Alternatively, such a model might also be used to identify and select a preferable processing option associated with the fastest application execution time within a given power consumption constraint.

Given the complexity of computing platforms and applications, and the vast array of options for executing each task associated with these applications, providing a realistic model for identifying a preferable option from among the identified options can present a challenge. For instance, since an application can have any number of executable tasks with any number of processing requirements and/or dependencies, and since computing platforms can have multiple processors and one or more buses communicatively linking each of these processors, the number of possible schedules for executing the tasks can be enormous. To further complicate matters, these processors and/or bus(es) can be programmed/configured to operate at different setting(s), or operation modes, associated with distinct processing speed and power consumption parameters.

Existing configuration/scheduling approaches directed to minimizing the power consumption of computing platforms for processing an application within a certain time constraint are not optimal because they tend to rely on models which do not account for discrete computing resource operating modes and/or transition costs for transitioning between each mode when executing an application. In other words, these models typically (1) treat each processor and/or bus in a computing platform as being associated with a continuous range of operational settings rather than a series of discrete operational modes and/or (2) treat each potential task in isolation—thus failing to account for the power and latency costs for a resource to transition from one mode to another.

For example, many processors can be configured to operate in one of several possible modes of operation, each being associated with a certain computing/executing speed and power consumption requirement. This can range from active modes such as full speed or partial speed (e.g., 25% of full speed), to dormant modes such as idle or standby. As such, transitioning from one of these modes to another can entail certain speed and power consumption costs, such as waking up to a certain active mode for instance. Approaches that rely on models that do not account for these operating modes and/or these transition costs fail to provide a realistic representation of the available resources on the platform. This in turn makes it unlikely that approaches relying on these models will be successful in identifying an optimal operating configuration(s) and schedule for executing tasks within a given time.

Accordingly, there is a need for a configuration/scheduling approach that utilizes a more realistic resource model to reduce a computing platform's power consumption when executing an application within a given amount of time.

SUMMARY

Energy management modeling and scheduling techniques are described for reducing the power consumed to execute an application on a multi-processor computing platform within a certain period of time.

In one embodiment, a sophisticated resource model accounts for discrete operating modes for computing components/resources on a computing platform and transition costs for transitioning between each of these discrete modes. This resource model provides information for a specific heterogeneous multi-processor computing platform and an application being implemented on the platform in a form that can be processed by a selection module, typically utilizing an integer linear programming (ILP) solver or algorithm, to select a task schedule and operating configuration(s) for executing the application within a given time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

Figure 1:
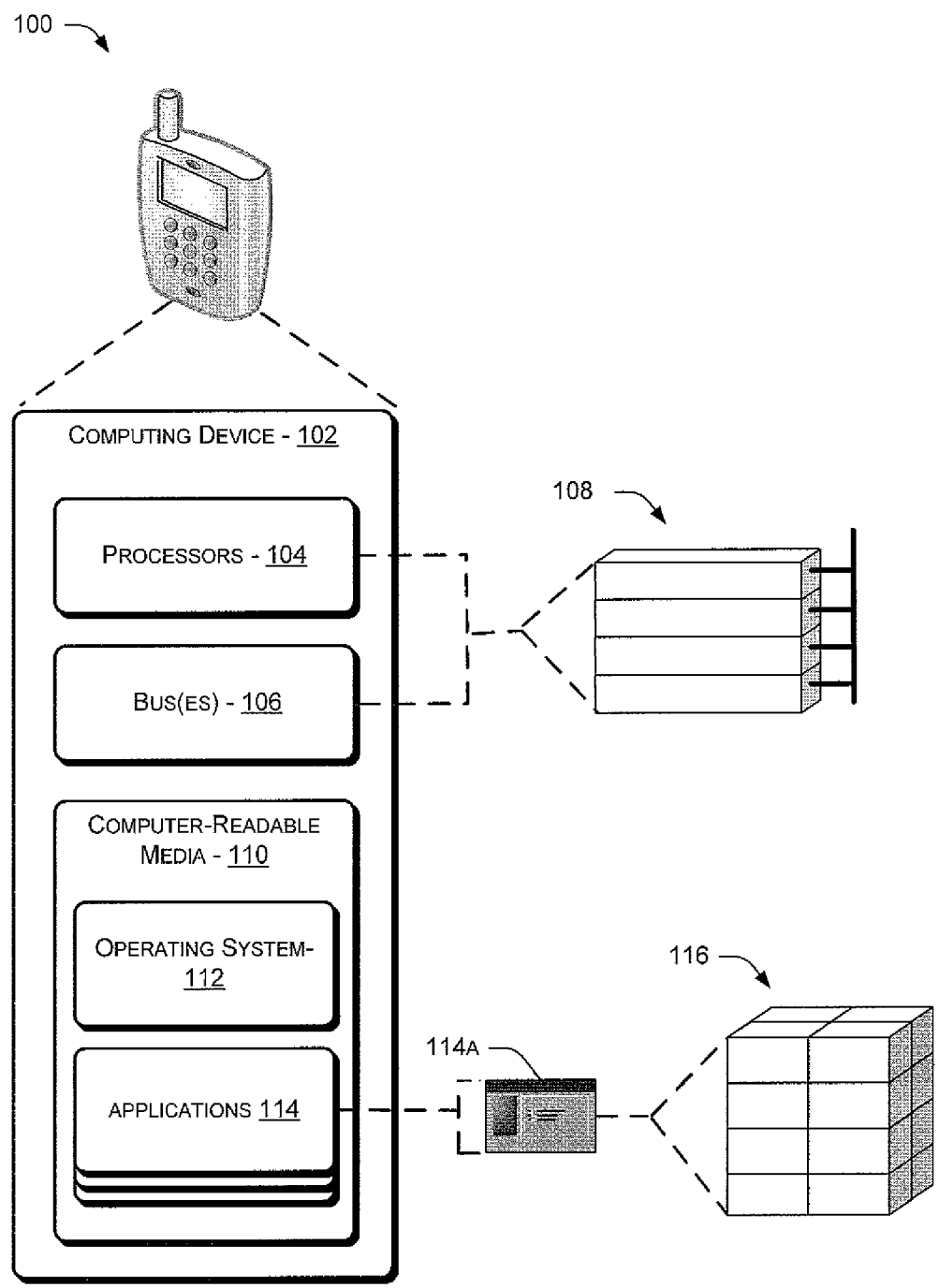
FIG. 1 illustrates an exemplary computing environment, in accordance with at least one embodiment.

This disclosure is directed to energy management modeling and scheduling techniques for reducing the power consumed by a computing platform executing an application within a given time constraint. In at least some embodiments, the computing platform has at least two heterogeneous processors (i.e., at least two different types of processors with dissimilar operating characteristics), each associated with one or more distinct processing speed and power consumption parameters. More particularly, the disclosed energy management techniques involve providing a resource model which includes an application specification, one or more resource specifications and one or more mapping specifications. The application specification represents an application as a series of task graphs comprising individual tasks that make up the application. The resource specification(s) identifies discrete operating modes for each resource on the computing platform capable of executing the application, processing speed and power consumption parameters associated with each discrete operating mode, and transition costs associated with transitioning between the discrete operating modes. The mapping specification(s) provides a task/resource mapping for each individual task and each resource operating mode, and a maximum (worst-case) processing time value for each mapping. This resource model can be processed, typically utilizing an integer linear programming (ILP) solver (i.e., algorithm), to identify and select (1) a schedule for executing the individual tasks making up the application and (2) operating configurations for the resources executing the application that are associated with a reduced power consumption.

Multiple and varied implementations and embodiments are described below. Generally, any of the functions described with reference to the figures can be implemented using software, firmware (e.g., fixed logic circuitry), manual processing, or a combination of these implementations. The term, "module" or "functionality" as used herein generally represents software, firmware, or a combination of software and firmware. For instance, in the case of a software implementation, the term" "module" or "functionality" represents program code (or declarative content) that performs specified tasks when executed on a processing/computing device or devices (e.g., CPU or CPUs). The program code can be stored in one or more computer readable memory devices. More generally, the illustrated separation of modules and functionality into distinct units may reflect an actual physical grouping and allocation of such software and/or hardware, or can correspond to a conceptual allocation of different tasks performed by a single software program and/or hardware unit. The illustrated modules and functionality can be located at a single site (e.g., as implemented by a processing device), or can be distributed over multiple locations (e.g., as implemented by multiple processing devices).

Exemplary Computing System

FIG. 1 illustrates an exemplary computing environment 100 for implementing the disclosed energy management modeling and scheduling techniques. It is to be appreciated that computing environment 100 is but one example of a suitable computing environment and is not intended to suggest any limitation as to the scope of use or functionality of the disclosed techniques. As such, the various described embodiments can be operational with numerous other general purpose or special purpose computing system environments or configurations. Neither should computing environment 100 be interpreted as having any dependency or requirement relating to any one or combination of illustrated components.

Computing environment 100 includes, in this example, computing device 102. Although computing device 102 is illustrated in the form of a mobile computing device, it is to be appreciated and understood that one or more other suitable computing devices can be utilized without departing from the spirit and scope of the claimed subject matter. Other suitable computing devices can include, by way of example and not limitation, desktop computers, portable computers, handheld computers such as personal digital assistants (PDAs), cell phones, tablet computers, teleconference devices, smart phones and the like.

Computing device 102 includes multiple central processing units (CPUs) or processors 104, each of which are capable of being configured to run in one or more possible operating modes, as will be appreciated and understood by one skilled in the art. In addition, two or more of the multiple processors can be heterogeneous processors (i.e., having dissimilar operating characteristics). By way of example and not limitation, certain 32-bit micro-processors using ARM technology and certain MSP430 microcontrollers are heterogeneous processors which can both be included in a computing device, such as computing device 102 for instance. Each of these types of processors can be programmed to operate in one of the several power modes of operation by one or both of software-controlled voltage (DVS) methods and operating frequency (DPM) methods. Each of these power modes is associated with a certain computing/execution speed and power consumption requirement.

Furthermore, transitioning from one of these modes to another can entail certain speed and power consumption costs. By way of example and not limitation, many processors have an operating mode, typically called a "standby mode", that is associated with a relatively low amount of operating power consumption. In this mode, almost all components inside the processor are turned off, including the internal oscillator. As a consequence, when a processor "wakes up" from the standby mode to transition to another mode, the processor must wait until the internal oscillator stabilizes before it can start computing—which can require (i.e., cost) a relatively large amount of power and time. These "wake up" costs can vary significantly depending on which mode the processor transitions to next. For instance, the wakeup costs associated with transitioning to a processor operating mode characterized by a relatively low computing/executing speed can be substantially less than that associated with transitioning to a relatively high computing/executing speed. As another non-limiting example, many processors also have an operating mode, typically called an "idle mode", associated with an operating power consumption slightly higher than the "stand by" mode but with lower "wake up" costs than the "stand by" mode.

Computing device 102 also includes one or more buses 106 for communicatively coupling or linking multiple processors 104. Similar to processors 104, and as will be appreciated and understood by one skilled in the art, each of one or more buses 106 is capable of being configured to run in one or more possible operating modes—each associated with a certain communication speed and power consumption requirement.

Processors 104 and one or more buses 106, which are computing platform resources making up at-least part of a computing platform on computing device 102, can be represented as one or more resource specifications 108. For the purposes of this discussion, one or more resource specifications 108 can be thought of as a characterization of these computing platform resources (and their configurations) provided in a form that can be included as part of a resource model, as will be described in more detail below. For the purposes of illustration, one or more resource specifications 108 are depicted here as a stack of four processors (rectangles) communicatively connected by a bus (black line). However, it is to be appreciated and understood that one or more resource specifications 108 can include any number of processors and any number of buses without deviating from the spirit and scope of the claimed subject matter.

Computing device 102 also includes one or more computer-readable media 110. One or more computer-readable media 110 in turn includes operating system 112 and one or more software applications 114, both of which are executable by processors 104. One of one or more applications 114 is depicted here as application 114a. Application 114a can be any suitable type of application consisting of one or more executable tasks. By way of example and not limitation, in at least one embodiment application 114a is a sound source localization (SSL) sensing application that uses an array of microphones to detect the direction of a sound source.

As will be described in detail below, application 114a can be represented as application specification 116. For the purposes of this discussion, application specification 116 can be thought of as a characterization of application 114a in the form of a series of configurations that make up application 114a. Each of the configurations is a directed graph of asynchronous components which can be referred to as a task graph. Each task graph can be associated with a maximum acceptable execution time in which the tasks that comprise that task graph can be executed/performed. Alternatively or additionally, each task graph can be associated with a maximum amount of power which can be used to execute/process the tasks that comprise that task graph. Accordingly, application specification 116 can be thought of as designating a time constraint and/or power consumption constraint for executing application 114a. Furthermore, each of the asynchronous components in a task graph can be referred to as a task. For the purposes of illustration, application specification 116 is depicted here as a cube containing 16 task graphs (rectangles). However, it is to be appreciated and understood that application specification 116 can comprise any number of task graphs (and thus tasks) without deviating from the spirit and scope of the claimed subject matter.

Figure 2:
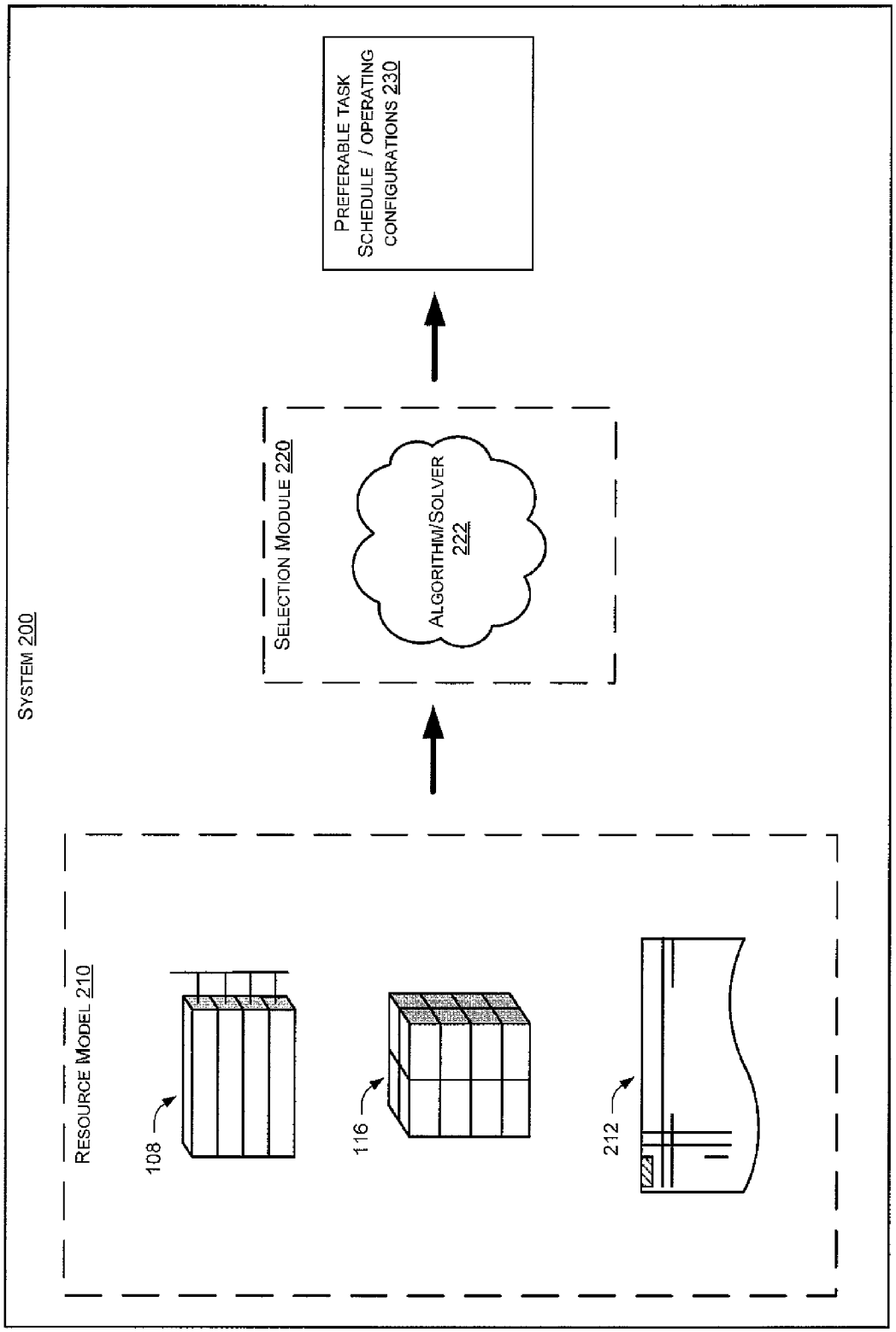
FIG. 2 illustrates an exemplary system for implementing the disclosed techniques, in accordance with at least one embodiment.

FIG. 2 illustrates an exemplary system 200 for implementing the disclosed energy management modeling and scheduling techniques, in accordance with one embodiment. System 200 can be implemented, at least in part, by one or more suitable computing devices, such as computing device 102 described above. In this regard and for discussion purposes, system 200 is described with reference to the exemplary computing environment 100 described above.

System 200 includes resource model 210 which provides a representation of application 114a, and of the possible processing options available for executing application 114, in a form that can be processed to identify and select a preferable processing option associated with executing application 114a in an acceptable amount of time and with a minimal amount of power. To facilitate the reader's understanding, this representation can be thought of as being in the form of a "solvable" problem capable of being "solved" by an algorithm, or solver, to identify and select the preferable processing option, as will be described in more detail below. For purposes of this discussion, the preferable processing option can be thought of as (1) the preferable task schedule designating which processor (of processors 104) will be used to execute each of the tasks making up application 114a above, and which bus (of bus(es) 106) will be used for any particular communication event (i.e., message) between tasks being executed on different processors and (2) the preferable operating mode configurations to be used for each processor and bus during each of its operations with respect to executing and communicating, respectively.

Continuing, resource model 210 includes three types of specifications: (1) one or more resource specifications 108 representing the computing resources available for executing application 114a, (2) an application specification 116 representing application 114a as one or more task graphs (each comprising a series of asynchronous tasks) and designating a maximum time for executing each task graph, and (3) one or more mapping specifications 212 mapping each task to each operating mode for each of the computing platform resources available for executing application 114a.

One or more resource specifications 108 list the various discrete operating modes for each computing platform resource and designate values for each operating mode parameter associated with each discrete operating mode. Specifically, recall that a particular processor can be associated with one or more possible operating modes (and thus defined by certain operational settings)—each mode being associated with a certain computing/execution speed parameter, a certain power consumption parameter, and certain speed and power consumption transition cost parameters, as described above. Similarly, each of the one or more buses 106 can be associated with one or more possible operating modes—each mode being associated with a certain communication speed parameter, power consumption requirement parameter, and in some embodiments, certain speed and power consumption transition cost parameters associated with switching between buses.

Resource model 210 also includes application specification 116 characterizing application 114a as one or more task graphs, each task graph comprising a series of asynchronous tasks. In addition, application specification 116 can include a designated maximum execution time (i.e., time constraint) for executing one or more of the task graphs. As such, application 114a itself can be associated with a maximum execution time.

In addition to one or more resource specifications 108 and application specification 116, resource model 210 includes one or more mapping specifications 212 which provide task-to-resource mappings (here, resources include processors 104 and one or more buses 106). Specifically, with respect to computing resources that are processors 104, at least one of the mapping specifications 212 maps each particular task to each operating mode for each processor capable of executing that particular task within the designated time constraint for that task's task graph. For each task-to-processor operating mode mapping, a worst case execution time is specified. Additionally, with respect to computing resources that are bus(es) 106, at least one of the mapping specifications 212 maps each possible communication event (i.e., message) between tasks (being executed on different processors) to each operating mode for each bus capable of transferring data associated with the communication event. For each task communication event-to-bus operating mode mapping, a worst case communication time or delay is specified. In this regard, a task communication event between tasks executed on the same processor (a local task communication event) will not require a bus and will typically be associated with a considerably shorter communication time than a task communication event between tasks executed on different processors (a non-local task communication event).

System 200 also includes selection module 220 for selecting the preferable processing option, here depicted as preferable task schedule and preferable operating mode configurations 230. Recall from above that resource model 210 provides a representation of application 114a and the possible processing options available for executing application 114a in the form of a "solvable" problem capable of being "solved" by a solver. As such, selection module 220 can process resource model 210, utilizing suitable algorithm/solver 222, to identify and select preferable task schedule and preferable operating mode configurations 230. In at least some embodiments, resource model 210 provides the representation in the form of a linear programming (LP) problem and algorithm/solver 222 is an integer linear program (ILP) algorithm, defined by a set of constraints, capable of "solving" the LP problem.

Finally, it should be noted that while system 200 is described in the context of the power consumption by certain processor and bus computing resource operations (processors 104 and one or more buses 106), other power consuming operations can also be accounted for, in other embodiments, without deviating from the course and scope of the claimed subject matter. By way of example and not limitation, other power consuming operations can include sensor reading, energy memory reading and/or writing, and the like.

Exemplary Process

Figure 3:
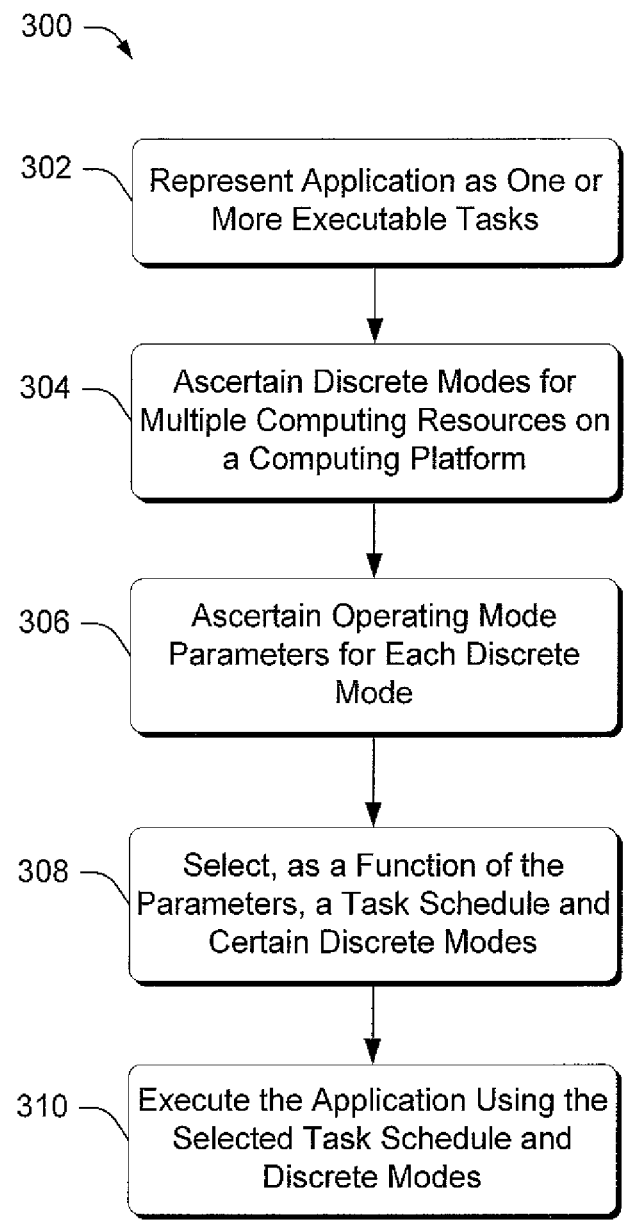
FIG. 3 illustrates a flow diagram illustrating an exemplary process for implementing the disclosed techniques, in accordance with at least one embodiment.

FIG. 3 illustrates an exemplary process 300 for implementing the disclosed energy management modeling and scheduling techniques with respect to executing an application within a certain time on a configurable multi-processor computing platform, such as the platform provided by computing device 102 above for example. In the context of software, the blocks represent computer instructions that, when executed by one or more processors, perform the recited operations. The order in which this process is described is not intended to be construed as a limitation, and any number of the described blocks can be combined in any order to implement the process, or an alternate process. Additionally, individual blocks may be deleted from the process without departing from the spirit and scope of the subject matter described herein.

At block 302, an application is represented as one or more executable tasks. This can be accomplished in any suitable fashion. By way of example and not limitation, in at least some embodiments a multi-node dataflow task model, such as application specification 116 above, is used where the application is structured as a set of abstract nodes, called configurations. In each configuration, the application is characterized as a set of asynchronous executable components, called tasks, interacting with various messages. As such, each configuration is considered a directed graph of tasks, called a task graph, with the tasks being linked by data precedence dependencies. In this regard, these tasks are recognized as being able to respond to input events, process them, and possibly generate output events—all within an asynchronous messaging environment, as will be appreciated and understood by one skilled in the art. In this approach, the asynchronous tasks can be mapped to different processors (according to the application's requirements) in a manner that is transparent to users. Within a configuration, however, the structure of a task graph remains unchanged and each task graph remains associated with certain constraints, such as an execution time constraint for instance.

At block 304, discrete modes for multiple computing resources (e.g., processors and buses) on a computing platform are ascertained. In this regard, rather than treating each computing resource as being associated with a continuous range of operational settings, each computing resource is identified as having certain separate and distinct operating modes defined by specific operational settings which can be programmatically adjusted. By way of example and not limitation, and as described above, certain processors such as 32-bit micro-processors using ARM technology and MSP430 microcontrollers can be programmed to operate in one of the several modes of operation by methods such DVS and DPM. Each of the discrete operating modes can be ascertained in any suitable way. For example, as described above, a resource specification such as resource specification 108 above can provide this information.

At block 306, operating mode parameters for each discrete mode are ascertained. In this regard, recall that each of the discrete modes ascertained at block 304 are defined by specific operational settings—such as a certain computing/execution speed with processors and a certain communication transfer speed with buses. As such, each discrete mode is associated with certain operating mode parameters, such as a processing speed parameter and power consumption parameter. By way of example and not limitation, the MSP430 microcontrollers described above can be programmed to operate in one of the several modes of operation (e.g., 2.2 MHz and "Idle"), each of which being associated with a certain computing/executing speed parameter (e.g., 2.2 MHz and 0 MHz respectively) and power consumption parameter (e.g., 2.7 mW and 0.005 mW). Furthermore, as explained above, each discrete mode can also be associated with other operating mode parameters, such as certain speed and power consumption transition cost parameters associated with transitioning to another operating mode. For example, with the MSP430 microcontrollers described above, a certain speed transition cost and power consumption cost is associated with transitioning from an "idle mode" to a "full speed" mode (e.g., a speed transition cost of 6 μs and a negligible power consumption cost).

Each of these operating mode parameters can be ascertained in any suitable way. For example, as described above, a resource specification such as resource specification 108 above can provide this information.

At block 308, as a function of the parameters, a task schedule and certain discrete modes are selected. While this can be accomplished in any suitable way, in at least some embodiments the application representation from the multi-node dataflow task model (such as application specification 116) from block 302 is included in a resource model (such as resource model 210) that also includes a representation of the ascertained operating modes defined by specific operational settings (such as resource specification(s) 108) from block 306. In addition, the resource model includes a task/resource mapping (such as one or more mapping specifications 212) between each task in the application specification and each discrete processor operating mode (task-to-processor mapping specification) and between each task communication event and bus (task communication event-to-bus specification). Each task-to-processor mapping reflects a potential discrete operating mode (for each processor) that can be used to execute a particular task in the application. Each task communication event-to-bus mapping reflects a potential discrete operating mode (for each bus) that can be used to with respect to communicating information between two application tasks being executed on different processors. As such, each potential combination of task/resource mappings (i.e., each processing option) designates a task schedule (designating which processor will be used to execute each of the tasks and which bus will be used for each communication event between the tasks) and discrete operating mode configuration for each processor and/or bus during each of its operations.

By virtue of the fact that the operating mode parameters (and thus processing speed and power consumption costs) for each discrete operating mode, and each transition between modes, have been ascertained (at block 306), each potential combination of task/resource mappings can be identified as having a certain processing speed and power consumption cost. This allows the combination of mappings (i.e., processing option) associated with the lowest overall power consumption cost to be identified and selected by utilizing an optimization algorithm, such as algorithm/solver 222 above for example.

At block 310, the application is executed using the selected task schedule and discrete modes. In other words, the combination of mappings (i.e., processing option) associated with the lowest overall power consumption cost is used to execute each task (and thus each task graph) making up the application.

Exemplary Resource Model

Figure 4:
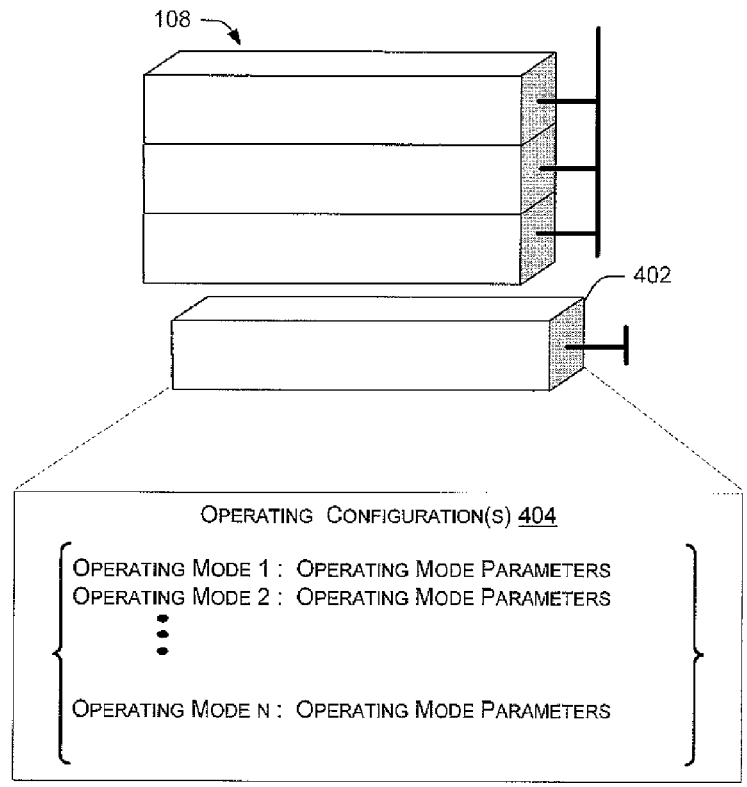
FIG. 4 illustrates an exemplary resource specification, in accordance with at least one embodiment.
Figure 6:
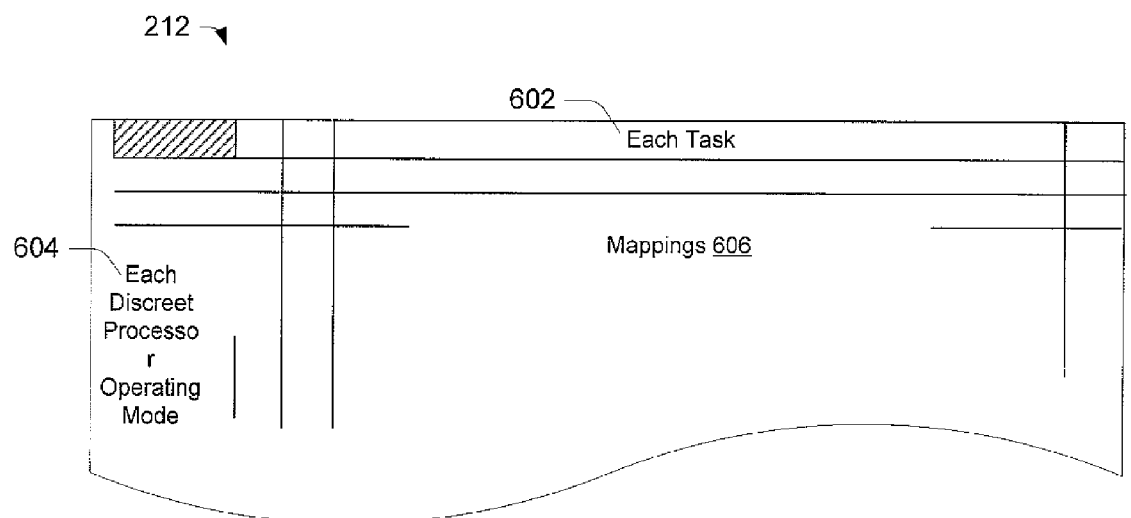
FIG. 6 illustrates an exemplary mapping specification, in accordance with one embodiment.
Figure 5:
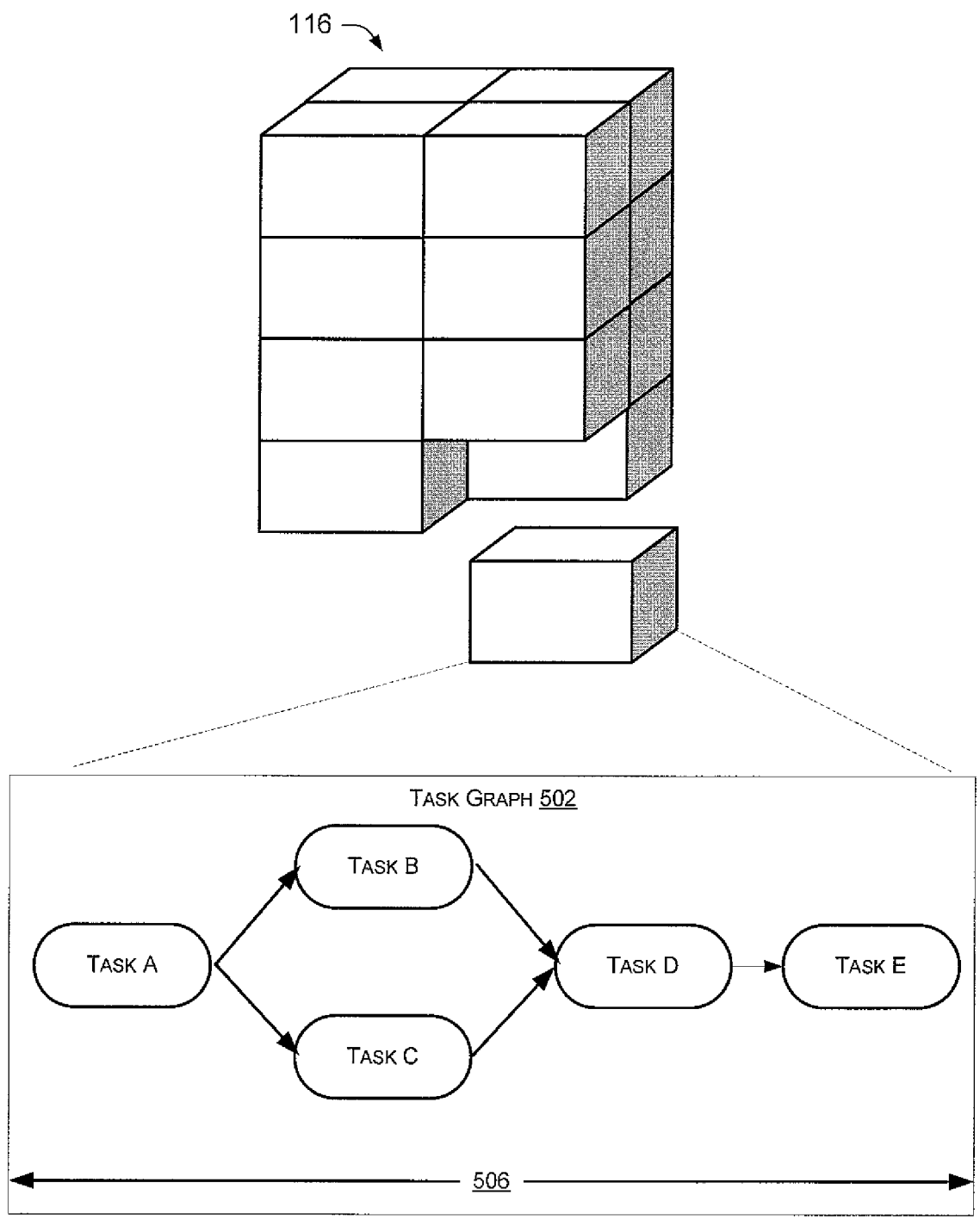
FIG. 5 illustrates an exemplary application specification, in accordance with one embodiment.

FIGS. 4-6 illustrate exemplary portions of an exemplary resource model, such as resource model 210, for implementing the disclosed energy management modeling and scheduling. For discussion purposes, FIGS. 4-6 are described in the context of computing environment 100 and system 200 above. However, it is to be appreciated and understood that this constitutes but one example and is not to be used to limit the application of the claimed subject matter.

Specifically, FIG. 4 illustrates exemplary one or more resource specifications 108 which, as noted above, can be thought of as a characterization of computing platform resources (and their configurations) provided in a form that can be included as part of resource model 210. While one or more resource specifications 108 are depicted here as a stack of four processors communicatively connected by a bus, any number of processors and any number of buses can be included in without deviating from the spirit and scope of the claimed subject matter. Furthermore, for the sake of brevity, one or more resource specifications 108 will only be described in the context of the stack of four processors. However, it is to be appreciated and understood that the bus connecting these processors can be described and depicted in a similar manner.

One of the processors of one or more resource specifications 108 is depicted here as processor 402. As with the other processors, processor 402 is associated with one or more operating configurations, here depicted as operating configuration(s) 404. Each of the operating configuration(s) 404 correlate with a certain operating mode (e.g., operating mode 1, 2 . . . n), each operating mode being associated with certain operating mode parameters. Without limitation, these operating parameters can include an execution speed parameter, a power consumption requirement parameter, and certain speed and power consumption transition cost parameters, as described above.

FIG. 5 illustrates an exemplary application specification 116 which, as noted above, can be thought of as a characterization of application 114a in a form that can be included as part of resource model 210. This characterization includes a series of configurations, each configuration being a directed graph of asynchronous components (i.e., task graph). While application specification 116 is depicted here as a cube containing 16 task graphs, any number of task graphs can be included in application specification 116 without deviating from the spirit and scope of the claimed subject matter. For the purposes of this discussion, each task graph is treated independently.

One of the task graphs of application specification 116 is depicted here as task graph 502. Note that task graph 502 includes five distinct tasks, some of which are dependant on the completion of other tasks and some of which can be executed (i.e., performed) simultaneously with one another. Specifically, note that task A must be executed before task B or task C can be executed, however task B and task C can be executed at the same time. As such, tasks B and C are dependant on task A. This dependency can be based on a logical and/or chronological relationship between these tasks. Similarly, task D can only be executed after task B and task C are performed, while task E can only be executed after task D is executed. It should be noted that while task graph 502 is depicted here as containing five tasks, any number of tasks can be included in task graph 502 without deviating from the spirit and scope of the claimed subject matter. Finally, recall that based at least in part on various task dependencies, each task graph can be associated with one or more execution time constraints, depicted here as execution time requirement 506. As such, application specification 116 is associated with a certain time constraint as well.

FIG. 6 illustrates exemplary one or more task/resource mapping specifications 212 which, as noted above, is provided in a form that can be included as part of resource model 210. Task/resource mapping specification(s) 212 can include, without limitation, a task-to-processor mapping specification and a task communication event-to-bus specification. For the sake of brevity, one or more resource specifications 108 will only be described in the context of a task-to-processor mapping specification. However, it is to be appreciated and understood that a task communication event-to-bus specification can be described and depicted in a similar manner.

Task/resource mapping specification(s) 212 (task-to-processor mapping specification in particular) includes a list containing each task 602 in an application and a list containing each discrete processor operating mode 604 for each processor available on a computing platform responsible for executing the application. In this regard, each task can be mapped to each discrete operating mode for each processor to provide mappings 606 between each task and each discrete processor operating mode. While the list containing each task 602 and the list containing each discrete processor operating mode 604 can be created in any suitable way, in at least some embodiments an automated process can be utilized to extract a listing of each task from application specification 116 and a listing of each discrete mode from resource specification(s) 108. By way of example and not limitation, in at least some embodiments, an automated process for parsing the task graphs and resource specifications can be utilized.

For each of mappings 606, information specific to that mapping can be included. This information can include, without limitation, a worst-case execution time for the mapped task. Accordingly, since application specification 116 designates a maximum execution time for executing each task graph, and thus application 114a as a whole. As such, individual mappings between tasks and discrete processor operating modes that would result in the maximum execution time being exceeded can easily be removed from the task-to-processor mapping specification (and thus from one more task/resource mapping specifications 212).

With respect to one or more task/resource mapping specifications 212, each combination of individual mappings (e.g., without limitation the task-to-processor mapping specification and task communication event-to-bus specification) can be scrutinized, in light of the information provided by one or more resource specifications 108 and application specification 116 to identify and select the combination of mappings associated with the lowest overall power consumption cost for executing all of the tasks in application 114a.

Exemplary Resource Model Implementation

In the context of an exemplary resource model, one or more resource specifications, application specification and one or more task/resource mapping specifications can be characterized in any suitable way. As such, the following exemplary implementation for each type of specification is provided to facilitate the reader's understanding with respect to how resource model 210 represents an LP problem that can be solved by an ILP solver (i.e., algorithm), such as the exemplary ILP solver characterized below. In this regard, the following notation convention is used to describe each of the types of specifications and the exemplary solver: constant parameters are written in lower-case italics (e.g., "$c$"), variables are written in upper-case italics (e.g., "I"), and the sets of the model are written in double-underlined upper-case letters (e.g., "P").

Exemplary Resource Specification

Resource specification(s) 108 can be characterized in the following manner as will be appreciated and understood by one skilled in the art. A set of processors communicates through a set of buses. In this regard, it can be assumed that each bus is either shared using a time division multiple access (TDMA)—based protocol or is dedicated to a single processor, as will be appreciated and understood by one skilled in the art. While more general processor communication models are possible, for the sake of simplicity only these communication models are included here.

A power consumption model for each component $c \in \underline{\underline{P}} \cup \underline{\underline{B}}$. For each processor or bus c a set of active operating modes M specified with power $p_{c,m}$ consumed in each mode $m \in M$. A mode is captured by all parameters that define the power consumption of the node, such as voltage and frequency scaling, as well as memory and peripheral configurations, as will be appreciated and understood by one skilled in the art.

In addition to active power modes $\underline{\underline{M}}$, there are typically two sleep modes $\underline{\underline{S}} = \{I, S\}$, with IDLE mode being I and STBY mode being S. In the IDLE mode I (sometimes also called a halt mode), the CPU simply runs no operation (NOP) instruction with no memory or peripheral access. The internal clock is not stopped, but most other internal components are. For $c \in \underline{\underline{P}} \cup \underline{\underline{B}}$ IDLE mode is specified with $p_{c,I}$ the power consumed on component c in IDLE mode I.

In the STBY mode S the internal oscillator is completely stopped but it can be maintained outside the chip, (e.g., through a real-time clock). For $c \in \underline{\underline{P}}$ STBY mode is specified with: $P_{c,S}$—the power consumed on component in STBY mode S, $p'_{c,m}$—the power consumed during waking up from STBY to mode $m \in \underline{\underline{M}}$, and $\tau^{tcm}$ the wake-up time to mode $m \in \underline{\underline{M}}$. The costs of waking up from the IDLE are often considerably smaller than the same costs for the STBY mode and is thus ignored in the model.

We also assume that a bus can only operate at one active mode within one configuration to avoid the complexity of dynamically synchronizing the TDMA protocol.

For each component $c \in \underline{\underline{P}} \cup \underline{\underline{B}}$ an upper bound on allowed component utilization $u_p$.

Exemplary Application Specification

Application specification 116 can be characterized in the following manner as will be appreciated and understood by one skilled in the art. A directed acyclic task graph $\underline{\underline{G}} = (\underline{\underline{T}}, \underline{\underline{E}})$ with a set of tasks $\underline{\underline{T}}$ and $\underline{\underline{E}} \subseteq T^2$. Let $\tau \in T$ denote a task, and let a pair $(\tau_i, \tau_j) \in \underline{\underline{E}}$ denote data dependency (i.e., precedence between two tasks $\tau_i$ and $\tau_j$).

A period $\pi$ of the execution of the task graph. Here we present the procedure for a single-rate applications. In a multi-rate case, different task subgraphs may have different periods, the constraints are written for multiple instances of subgraphs, and $\pi$ is defined as the least common multiple of all subgraph periods. A release time $r_\tau$ for each source node $\tau \in \text{Src}(\underline{\underline{G}})$, and a deadline time $d_\tau$ for each sink node of $\tau \in \text{Dst}(\underline{\underline{G}})$. A source (resp. sink) node is each node of $\underline{\underline{G}}$ with input (resp. output) degree equal to 0. We assume $r_\tau \leq 0$ for each source, and $d_\tau \leq \pi$ for each sink node $\tau$.

Exemplary Mapping Specification

Mapping specification(s) 212 can be characterized in the following manner as will be appreciated and understood by one skilled in the art.

For each task $\tau \in \underline{\underline{T}}$, processor $p \in \underline{\underline{P}}$ and mode $m \in \underline{\underline{M}}$, the worst-case task execution time $t_{\tau,p,m}$. This value can be measured or estimated by computing worst-case task number of cycles.

For each task $\tau \in \underline{\underline{T}}$, bus $b \in \underline{\underline{B}}$ and mode $m \in \underline{\underline{M}}$, the worst-case communication time $t_{\tau,b,m}$ of the message that contains task output. This value can be measured or estimated by determining the largest size of the output of task $\tau$.

An optional allocation mapping a of tasks in $\underline{\underline{T}} \subseteq \underline{\underline{T}}$ to processors: $a_{\tau,p} = 1$ if task $\tau \in \underline{\underline{T}}$ is pre-allocated to processor $p \in \underline{\underline{P}}$, otherwise $a_{\tau,p} = 0$. Depending on a problem instance, for a subset $\underline{\underline{T}}$ of tasks $\underline{\underline{T}}$ allocation may be determined directly by the problem specification. For instance, a data sampling task may execute only on certain processor boards connected with a particular sensor. Similarly, a subset of tasks may have preassigned modes of operation.

Exemplary Algorithm/Solver Implementation

While the number of processors, bus(es) and operational modes for the processors and bus(es) on a computing platform is finite and typically relatively small, recall that the number of possible schedules for executing the tasks can be enormous. As such, encoding each of the task/resource mappings with binary variables is typically not a realistic/practical approach with respect to processing a resource model such as resource model 210. However, an ILP algorithm/solver can be used, regardless of the number of possible schedules for executing the tasks. In principle, a correct ILP algorithm/solver will always find an optimal solution, whenever there exists a feasible schedule that satisfies all constraints.

As noted above, resource model 210 represents an LP problem that can be solved by an ILP solver (i.e., algorithm), such as an exemplary ILP solver available from ILOG® and referred to as a CPLEX solver. An exemplary characterization of an LP problem that can be solved by such an exemplary is described below. Specifically, an exemplary characterization of ILP variables, ILP constraints and ILP objectives are provided below. In this regard, the following notation convention is used to describe each of the types of specifications and the exemplary solver, as will be appreciated and understood by one skilled in the art: constant parameters are written in lower-case italics (e.g., "c") variables are written in upper-case italics (e.g., "I"), and the sets of the model are written in double-underlined upper-case letters (e.g., "P").

Exemplary Core ILP Variables

Exemplary core variables of the LP problem suitable for being solved by the exemplary CPLEX algorithm/solver consist of the following for each task $\tau \in \underline{\underline{T}}$, each processor $p \in \underline{\underline{P}}$, each bus $b \in \underline{\underline{B}}$, and each mode $m \in \underline{\underline{M}}$:

Binary task-to-component allocation variable A. $A_{\tau,p} = 1$ if task $\tau$ is allocated to processor p. $A_{\tau,p} = 1$ if the output of $\tau$ is communicated over bus b.

Binary task-to-mode and bus-to-mode variable M. $M_{\tau,m} = 1$ if task $\tau$ is to execute in mode m. $M_{b,m} = 1$ if bus b is to operate in mode m.

Binary task transition variable X. $X_\tau = 1$ if, on a processor to which $\tau$ is allocated, the execution of task $\tau$ starts after a wake-up from standby mode S.

Integer task execution and communication start time-instant variables $S^e$ and $S^c$. Let $S_\tau^e$ denote the time instant when $\tau$ starts executing, and let $S_\tau^c$ denote the time instant when $\tau$ starts communicating its output.

In general, if the ILP problem variables are bounded, as in this example, the problem is NP-hard. However, problems with thousands of variables and constraints can efficiently be solved with modern ILP tools. Nevertheless, in this example the number of core variables is relatively small so as to minimize the actual computational complexity.

Exemplary Derived ILP Variables

Since some constraints cannot be represented as linear expressions of core program variables, additional variables are needed for the linear form of the formalism. Typically, such variables are determined once the values for the core variables are set. We use the following binary derived variables:

Task allocation variables: $U_{\tau,p,m}=1$ if task $\tau$ is allocated to processor p and executes in mode m. $K_{\tau,p,m}=1$ if $U_{\tau,p,m}=1$ and $\tau$ starts after a wake-up from standby mode S. $U_{\tau,b,m}=1$ if the output of task $\tau$ is communicated over a bus b which operates in mode m.

Task sequencing variables: $V_{\tau,\tau',p}=1$ if $\tau$ and $\tau'$ are both allocated to processor p. $N_{\tau,\tau',p}=1$ if $V_{\tau,\tau',p}=1$ and $\tau'$ immediately follows $\tau$, not necessarily within the same period iteration. $B_{\tau,\tau',p}=1$ if $V_{\tau,\tau',p}=1$ and $\tau'$ immediately follows $\tau$ across period boundaries (i.e., $\tau'$ is the first and $\tau$ the last executing on p in an iteration. $R_{\tau,\tau',p}=1$ if $N_{\tau,\tau',p}=1$ and between the two tasks the processor p is in the standby mode S. Let $H_{\tau,\tau',p}$ represent the time spent in the standby mode between $\tau$ and $\tau'$.

Exemplary ILP Constraints

Practically, for the exemplary CPLEX solver described herein, all constraints have to be of the form $(\Sigma_i a_i \cdot X_i) \rho b_i$, where $\rho$ is an element of the set $\{\leq, =, \geq\}$, coefficients $a_i$ and $b_i$ are real-valued constants and $X_i$ are program variables that can be of either binary (i.e., 0 or 1) or integer type. Accordingly, the LP problem is defined with the following set of constraints:

System assumptions. A task is allocated to a single processor and a single mode. For all tasks $\tau \in \underline{T}$:

$$\sum_{p \in \underline{P}} A_{\tau,p} = 1$$

and, $$\sum_{m \in \underline{M}} M_{\tau,m} = 1$$

A shared bus operates in single mode (other than idle mode I). For all buses $b \in \underline{B}$:

$$\sum_{m \in \underline{M}} M_{b,m} = 1$$

Execution and communication time. Note that for arbitrary binary variables X, Y and Z, satisfying expression X AND Y=Z, the following integer inequality holds: $0 \leq X+Y-2Z \leq 1$. Since $U_{\tau,p,m}=1$ if and only if $A_{\tau,p}=1$ and $M_{\tau,m}=1$, we have $$0 \leq A_{\tau,p} + M_{\tau,m} - 2 \cdot U_{\tau,p,m} \leq 1$$

Similarly, $$0 \leq A_{\tau,b} + M_{b,m} - 2 \cdot U_{\tau,b,m} \leq 1$$

Note that the solution execution time $E\tau$ of task $\tau$, and communication time of its output $C\tau$, can be represented as the following linear expressions that will be used as a shorthand in other constraints $$E_\tau \triangleq \sum_{p \in \underline{P}} \sum_{m \in \underline{M}} t_{\tau,p,m} \cdot U_{\tau,p,m},$$

$$C_\tau \triangleq \sum_{b \in \underline{B}} \sum_{m \in \underline{M}} t_{\tau,p,m} \cdot U_{\tau,p,m}$$

Wake-up time. since $K_{\tau,p,m}=1$ if and only if $X_\tau=1$ and $U_{\tau,p,m}=1$, we have $$0 \leq X_\tau + U_{\tau,b,m} - 2 \cdot K_{\tau,P,m} \leq 1$$

the Wake-up time $W_\tau$ of task $\tau$ can be represented as $$W_\tau \triangleq \sum_{p \in \underline{P}} \sum_{m \in \underline{M}} t'_{p,m} \cdot K_{\tau,p,m}$$

Release, deadline and utilization. Each source task $\tau \in Src(\underline{G})$ cannot start execution before its release time instant $$r_\tau \leq S_\tau^e$$

Similarly, each sink task $\tau \in Dst(\underline{G})$ has to complete execution before its deadline time instant $$S_\tau^e + E_\tau \leq d_\tau$$

Each processor or bus $c \in \underline{P} \cup \underline{B}$ cannot be utilized above its maximum allowed utilization $u_c$ $$\sum_{\tau \in \underline{T}} \sum_{m \in \underline{M}} t_{\tau,c,m} \cdot U_{\tau,c,m} \leq \pi \cdot u_c$$

Ordering. By definition $V_{\tau,\tau',p}=1$ if and only if $A_{\tau,p}=1$ and $A_{\tau',p}=1$, we have $$0 \leq A_{\tau,p} + A_{\tau',p} - 2 \cdot V_{\tau,\tau',p} \leq 1$$

Binary variable $N_{\tau,\tau',p}$ is 1 if and if on processor p task $\tau'$ executed immediately after task $\tau$. The following three expressions put constraints on $N_{\tau,\tau',p}$ $$N_{\tau,\tau',p} \leq V_{\tau,\tau',p}$$

$$\sum_{\tau' \in \underline{T}} N_{\tau,\tau',p} \leq A_{\tau,p}$$

$$\sum_{\tau \in \underline{T}} \sum_{\tau' \in \underline{T}} N_{\tau,\tau',p} = \sum_{\tau \in \underline{T}} A_{\tau,p}$$

Binary variable $B_{\tau,\tau',p}$ is 1 if and only if $\tau'$ is the first and $\tau$ the last task executing on p. Thus we have $$B_{\tau,\tau',p} \leq N_{\tau,\tau',p}$$

For all $p \in \underline{P}$ $$\sum_{\tau \in \underline{T}} \sum_{\tau' \in \underline{T}} B_{\tau,\tau',p} = 1$$

The following short notation can be used $$V_{\tau,\tau'} \triangleq \sum_{p \in \underline{P}} V_{\tau,\tau',p}, N_{\tau,\tau'} \triangleq \sum_{p \in \underline{P}} N_{\tau,\tau',p}, B_{\tau,\tau'} \triangleq \sum_{p \in \underline{P}} B_{\tau,\tau',p}$$

For instance, $V_{\tau,\tau'}=1$, if there exists a processor such that both $\tau$ and $\tau'$ are allocated to it. If, for a given $\tau \in \underline{T}$ there is no $\tau' \in \underline{T}$ such that $(\tau,\tau') \in \underline{E}$ and the two tasks are allocated to different processors, then the output of $\tau$ should not be sent over any bus. Thus, for each task $\tau \in \underline{T}$ $$\sum_{b \in \underline{B}} A_{\tau,b} \leq \sum_{(\tau,\tau') \in \underline{E}} (1 - V_{\tau,\tau'})$$

As a consequence, for a task whose output is not sent over any bus we have $C\tau=0$.

Precedence. a task may be scheduled for execution only after all its predecessor tasks complete. For each dependant task pair $(\tau,\tau') \in \underline{E}$ $$S_\tau^e + E_\tau \leq S_{\tau'}^e$$

Also, the output of a task may be communicated only after the task completes. For each $\tau \in \underline{T}$ $$S_\tau^e + E_\tau \leq S_\tau^e$$

If the two tasks in a dependant task pair $(\tau,\tau') \in \underline{E}$ are assigned to different processors, then the start time instant of $\tau'$ is constrained by the completion of the communication of the output of $\tau$. In the following constraint, the number z is a positive constant with a large value. If the two tasks are assigned to the same processor the rightmost element takes a large value. The given constraint holds and the constraint is automatically satisfied—so the communication time is ignored. However, if the two tasks are not assigned to the same processor the rightmost element is zero and the communication time is taken into account. For each dependant task pair $(\tau,\tau') \in \underline{E}$ $$S_\tau^e + C_\tau \leq S_{\tau'}^e z \cdot V_{\tau,\tau'}$$

Overlap. A task can begin its execution anytime but its execution cannot overlap with the execution of other tasks. Recalling large constant z as in the previous constraint, the following constraint is not automatically satisfied only if $N_{\tau,\tau'}=1$, i.e., only if on a processor the execution of $\tau'$ immediately follows the execution of $\tau$. In essence, assuming $B_{\tau,\tau'}=0$, the following constraint requires $S_{\tau'}^e$ to be larger than $S_\tau^e$ for the execution time of task $\tau$ and wake-up time of task $\tau'$ (if different than 0). Binary variable $B_{\tau,\tau',p}$ is 1 if and only if $\tau'$ is the first and $\tau$ the last task executing on p. So, the term $-\pi \cdot B_{\tau,\tau'}$ accounts for the execution of $\tau$ extends over the period $\pi$ bound. For all $\tau,\tau' \in \underline{T}$ $$S_\tau^e + E_\tau + W_{\tau'} - \pi \cdot B_{\tau,\tau'} \leq S_{\tau'}^e + z \cdot (1 - N_{\tau,\tau'})$$

Since the bus is shared through a TDMA protocol an additional communication constraint is that two transmissions from the same processor board cannot overlap.

$$S_\tau^e + C_\tau - \pi \cdot B_{\tau,\tau'} \leq S_{\tau'}^e + z \cdot (1 - N_{\tau,\tau'})$$

Standby time. Derived binary variable $R_{\tau,\tau',p}=1$ if and only if $N_{\tau,\tau',p}=1$ and $K_{\tau'}=1$. Thus, $$0 \leq N_{\tau,\tau',p} + K_{\tau'} - 2 \cdot R_{\tau,\tau',p} \leq 1$$

If $R_{\tau,\tau',p}=1$ then derived variable $H_{\tau,\tau',p}$ is the time spent in standby mode S after completing $\tau$, otherwise $H_{\tau,\tau',p}=0$. If $R_{\tau,\tau',p}=1$ then both sides of the following inequality reduce to zero making $H_{\tau,\tau',p}$ equal to the standby time.

$$0 \leq S_\tau^e + E_\tau + H_{\tau,\tau',p} + W_{\tau'}' - S_{\tau'}^e - \pi \cdot B_{\tau,\tau',p} \leq z \cdot (1 - R_{\tau,\tau',p})$$

$$0 \leq H_{\tau,\tau',p} \leq z \cdot (1 - R_{\tau,\tau',p})$$

Predetermined variables. The pre-allocation of tasks $\underline{T}$ specified with the mapping a, which generates the following constraint. For all $\tau \in \underline{T}$ $$A_{\tau,c} = a_{\tau,c}$$

Objective Function

The optimization objective defines the objective function and specifies the optimization direction, minimum or maximum. In this exemplary implementation, optimization direction is to minimize power consumption while satisfying the timing and dependency constraints described above. Here, it is assumed that the adjustable system power consists of power consumed by computation and communication elements. Recall that $p_{c,m}$ denotes the power consumed on component $c \in \underline{P} \cup \underline{B}$ in mode $m \in \underline{M} \cup \underline{S}$, and $p'_{c,m}$ denotes the power consumed on c during a wake-up from the standby mode $S \in \underline{S}$ to mode $m \in \underline{M}$. Let $T_{c,m}$ be the total time in a single period spent on component $c \in \underline{P} \cup \underline{B}$ in mode $m \in \underline{M} \cup \underline{S}$, and $T'_{c,m}$ the time spent in waking up from standby mode to mode $m \in \underline{M}$. The system energy consumed in a period $\pi$ is given with the linear expression $$J = \sum_{c \in \underline{P} \cup \underline{B}} \left( \sum_{m \in \underline{M} \cup \underline{S}} p_{c,m} \cdot T_{c,m} + \sum_{m \in M} p'_{c,m} \cdot T'_{c,m} \right)$$

All power data is considered to be known, and all time variables can be represented through following linear expressions of the ILP problem variables defined previously:

$$T_{c,m} = \sum_{\tau \in \underline{T}} t_{\tau,c,m} \cdot U_{\tau,c,m} (\text{for } m \in M)$$

$$T'_{c,m} = \sum_{\tau \in \underline{T}} t'_{\tau,c,m} \cdot K_{\tau,c,m} (\text{for } m \in M)$$

$$T_{c,S} = \sum_{\tau \in \underline{T}} \sum_{\tau' \in \underline{T}} H_{\tau,\tau',c}$$

$$T_{c,I} = \pi - \sum_{m \in \underline{M}} (T_{c,m} + T'_{c,m}) - T_{c,S}$$

Extension

Recall that typically, there is a trade off between the amount of time and the amount of power that a computing platform requires to perform certain operations associated with an application. Furthermore, rather than focusing on minimizing the power consumption to execute an application within a certain time, sometimes it can be advantageous to focus on minimizing the amount of time to execute an application given a certain power consumption constraint.

Accordingly, the disclosed energy management modeling and scheduling techniques can also be used for reducing the time a computing platform takes to execute an application. Specifically, and in a manner similar to that described above, the disclosed energy management techniques can be used to provide a resource model which includes one or more resource specifications, an application specification, and one or more resource mapping specifications. With respect to the application specification, it can represent an application as a series of task graphs comprising individual tasks, with each task graph being associated with a maximum amount of power to be used to execute/process the tasks that comprise that task graph. As such, the application itself is associated with the power consumption constraint. Furthermore, with respect to the mapping specification, for each specific task/resource mapping, information specific to that mapping can include a worst-case power consumption value associated with executing the mapped task.

As such, in at least some embodiments, a selection module, such as selection module utilizing an ILP algorithm/solver, can be used to process the resource model to identify and select a preferable task schedule and preferable operating mode configurations associated with a decreased execution time given the power consumption constraint.

CONCLUSION

Although embodiments of techniques for reducing the power consumed to execute an application on a multi-processor computing platform within a certain time period have been described in language specific to structural features and/or methods, it is to be understood that the subject of the appended claims is not necessarily limited to the specific features or methods described. Rather, the specific features and methods are disclosed as exemplary implementations.

What is claimed is:

1. A method comprising: under control of one or more processors configured with executable instructions, configuring a computer to complete execution of an application within a given time period and using a total amount of power within a power consumption constraint, wherein the configuring comprises:
    representing the application as one or more executable tasks;
    ascertaining operating modes of a plurality of computing resources on the computer, the operating modes comprising at least a standby mode and an active mode, the operating modes being associated with mode parameters, the mode parameters comprising transition cost parameters associated with transitioning between the operating modes, the transition cost parameters comprising a time delay parameter and a transition power consumption parameter, the transition power consumption parameter being associated with a transition from a standby mode to an active mode of a computing resource of the plurality of computing resources; and
    selecting, based at least in part on one or more of the mode parameters:
    one or more computing resources from the plurality of computing resources; and
    one or more of the operating modes for each of the selected one or more computing resources to execute each of the one or more executable tasks, wherein the selecting comprises:
    mapping the one or more executable tasks with one or more of the operating modes to create a plurality of mappings; and
    identifying a combination of the plurality of mappings associated with a lowest overall power consumption for executing the application within the given time period.

2. A method as recited in claim 1, wherein the plurality of computing resources comprises multiple processors and one or more communication buses communicatively connecting the multiple processors.

3. A method as recited in claim 2, wherein the multiple processors comprise at least two processors that are heterogeneous.

4. A method as recited in claim 1, wherein the one or more-mode parameters further comprise:
    one or more processing speed parameters; or
    one or more operating power consumption parameters.

5. A method as recited in claim 1, wherein the selecting is accomplished at least in part by utilizing an optimization algorithm.

6. A method as recited in claim 1, wherein the selecting the one or more computing resources and the one or more operating modes for each of the selected one or more computing resources is further based on power consuming operations of one or more of a memory reading or a memory writing.

7. A method as recited in claim 1, wherein the selecting the one or more computing resources and the one or more operating modes for each of the selected one or more computing resources is further based on power consuming operations associated with a sensor reading.

8. A system comprising:
    one or more processors;
    memory communicatively coupled to the one or more processors;
    a resource model stored in the memory, comprising:
        an application specification to deliver a plurality of tasks that form an application;
        a resource specification to deliver one or more operating modes for each of a plurality of resource components in a computer; and
        one or more transition costs, each transition cost being associated with transitioning between two of the operating modes, one or more of the transition costs comprising a transition power consumption cost of a transition from an inactive operating mode to an active operating mode; and
    a selection module stored in the memory to process the resource model to select a task schedule designating, based at least on the one or more transition costs, one or more resource components from the plurality of resource components for processing the plurality of tasks of the application within a given time period and using a total amount of power within a power consumption constraint; and an operating mode from the one or more operating modes for each of the designated one or more resource components, wherein the selecting comprises:
    mapping the plurality of tasks with one or more of the operating modes to create a plurality of mappings; and
    identifying a combination of the plurality of mappings associated with a lowest overall power consumption for executing the application within the given time period.

9. A system as recited in claim 8, wherein the resource model further comprises a mapping specification to map each of the plurality tasks to each of the one or more operating modes, wherein a maximum task processing time is identified for each mapping of the plurality of tasks.

10. A system as recited in claim 8, wherein the plurality of resource components comprises multiple processors and at least one bus linking the multiple processors.

11. A system as recited in claim 8, wherein one or more of the one or more operating modes are associated with a processing speed value and power consumption value.

12. A system as recited in claim 11, wherein the task schedule and operating mode is selected, based at least in part on one or more of:
    the processing speed values associated with the one or more operating modes;
    the power consumption values associated with the one or more operating modes; and
    the one or more transition costs.

13. A system as recited in claim 8, wherein the selection module utilizes an integer linear programming (ILP) algorithm to process the resource model.

14. A memory storing computer-executable instructions that, when executed by one or more processors, configure the one or more processors to perform acts comprising:
   providing a model identifying possible processing options on a computer for executing an application comprising a plurality of tasks, the model accounting for one or more bus operating modes for at least one bus communicatively linking a plurality of processors, the model further accounting for:
   a message-to-bus mode mapping for individual messages between tasks being executed on different processors of the plurality of processors and each of the one or more bus operating modes;
   a communication time for each of the message-to-bus mode mappings;
   one or more processor operating modes for each of the plurality of processors associated with each processing option; and
   transition costs associated with transitioning between each of the one or more processor operating modes; and
   utilizing an integer linear programming (ILP) algorithm to process the model to select a processing option upon determining that the processing option limits a time to execute the application to within a time constraint while limiting total power consumption for executing the application to within a power consumption constraint.

15. The memory as recited in claim 14, wherein the model further accounts for a task-to-processor mode mapping for individual tasks and each of the one or more processor operating modes.

16. The memory as recited in claim 15, wherein the model further accounts for:
   a task execution time for each task-to-processor mode mapping.

17. The memory as recited in claim 14, wherein one or more of the acts are performed on a mobile computing device.

18. The memory as recited in claim 14, wherein the plurality of processors comprises at least two heterogeneous processors.

19. The memory as recited in claim 14, wherein the transition costs comprise a transition power consumption cost.

* * * * *